United States Patent [19]

Hamilton et al.

[11] Patent Number: 5,542,983
[45] Date of Patent: *Aug. 6, 1996

[54] PROCESS FOR CLEANING METAL SURFACES WITH PHYSICAL EMULSION OF TERPENE AND WATER

[75] Inventors: C. Richard Hamilton, Arvada; Ross M. Gustafson, Golden, both of Colo.

[73] Assignee: Biochem Systems, Wichita, Kans.

[*] Notice: The term of this patent shall not extend beyond the expiration date of Pat. No. 5,248,343.

[21] Appl. No.: 896,686

[22] Filed: Jun. 10, 1992

Related U.S. Application Data

[63] Continuation-in-part of Ser. No. 849,424, Dec. 6, 1991, Pat. No. 5,248,343, which is a continuation of PCT/US91/09310, Dec. 6, 1991, which is a continuation of Ser. No. 624,140, Dec. 7, 1990, now abandoned.

[51] Int. Cl.$^6$ .............................. B08B 7/04; B08B 3/08; C11D 7/50; B01D 61/14
[52] U.S. Cl. .............................. 134/10; 134/26; 134/40; 210/651; 510/238; 510/244; 510/254; 510/245; 510/109; 510/365; 510/417; 510/461; 510/505
[58] Field of Search .............................. 134/2, 10, 26, 134/40; 252/162, 171, 174.2, DIG. 14; 413/1, 2, 8; 427/327, 353; 210/651

[56] References Cited

U.S. PATENT DOCUMENTS

| | | | |
|---|---|---|---|
| Re. 29,649 | 5/1978 | Farnsworth | 252/171 |
| Re. 32,661 | 5/1988 | Binns | 252/142 |
| 2,711,978 | 6/1955 | Groom | 134/10 |
| 2,748,084 | 5/1956 | De Lew et al. | 134/40 |
| 2,923,648 | 2/1960 | K'Burg | 134/12 |
| 3,023,144 | 2/1962 | Greathouse et al. | 167/58 |
| 3,025,190 | 3/1962 | Groom et al. | 134/10 |
| 3,094,469 | 6/1963 | Strauss et al. | 204/141 |
| 3,450,086 | 6/1969 | Maddock | 114/74 |
| 3,548,543 | 12/1970 | Evans et al. | 51/8 |
| 3,634,338 | 1/1972 | Laugle et al. | 252/525 |
| 3,951,682 | 4/1976 | Schevey et al. | 134/102 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,082,867 | 4/1978 | Henley et al. | 427/327 |
| 4,091,954 | 5/1978 | Wallace | 220/470 |
| 4,136,217 | 1/1979 | Henley | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,452,264 | 6/1984 | Kreisel et al. | 134/58 |
| 4,477,290 | 10/1984 | Carroll et al. | 148/6 |
| 4,498,934 | 2/1985 | Potts | 134/254 |
| 4,506,533 | 3/1985 | Hessel et al. | 72/42 |
| 4,511,488 | 4/1985 | Matta | 252/162 |
| 4,537,640 | 8/1985 | Kreisel et al. | 134/18 |
| 4,540,505 | 9/1985 | Frazier | 252/106 |

(List continued on next page.)

FOREIGN PATENT DOCUMENTS

| | | |
|---|---|---|
| 2636149 | 3/1977 | Germany . |
| 2713516 | 9/1978 | Germany . |
| 2026551A | 5/1978 | United Kingdom . |
| 1603047 | 11/1981 | United Kingdom .............. C11D 7/24 |
| 2143254A | 2/1985 | United Kingdom . |

*Primary Examiner*—Jan H. Silbaugh
*Assistant Examiner*—Saeed Chaudhry
*Attorney, Agent, or Firm*—Sheridan, Ross & McIntosh

[57] ABSTRACT

Disclosed is a method and system for the efficient recycling of components involved in removing water insoluble contaminants from the surface of articles. A physically emulsified terpene-containing composition is applied to the surface of articles to effectively remove water insoluble contaminants. Following application, the physically emulsified composition quickly separates, releasing the contaminants and terpene from the water. The water, terpene and contaminants are separated for reuse in accordance with the present process. The physically emulsified composition includes between about 2 weight percent and about 40 weight percent of a terpene in water.

20 Claims, 1 Drawing Sheet

U.S. PATENT DOCUMENTS

| | | | |
|---|---|---|---|
| 4,599,116 | 7/1986 | King et al. | 134/2 |
| 4,615,744 | 10/1986 | Murtha | 134/25.2 |
| 4,620,937 | 11/1986 | Dellutri | 252/143 |
| 4,640,719 | 2/1987 | Hayes et al. | 134/40 |
| 4,654,089 | 3/1987 | Singelyn et al. | 134/26 |
| 4,704,225 | 11/1987 | Stoufer | 252/153 |
| 4,749,516 | 6/1988 | Brusky | 252/546 |
| 4,767,563 | 8/1988 | de Buzzaccarini | 252/174 |
| 4,790,951 | 12/1988 | Frieser et al. | 252/162 |
| 4,797,231 | 1/1989 | Schumann et al. | 252/547 |
| 4,798,218 | 1/1989 | Sauvan | 134/74 |
| 4,865,742 | 9/1989 | Falletti | 210/637 |
| 4,966,718 | 10/1990 | Johnson | 210/776 |

PROCESS FOR CLEANING METAL SURFACES WITH PHYSICAL EMULSION OF TERPENE AND WATER

REFERENCE TO RELATED APPLICATIONS

This application is a continuation-in-part of U.S. application Ser. No. 07/849,424 filed Dec. 6, 1991 now U.S. Pat. No. 5,248,343 which is a national phase of Patent Cooperation Treaty application Ser. No. US91/09310 filed Dec. 6, 1991 having priority based upon U.S. application Ser. No. 07/624,140 filed Dec. 7, 1990 now abandoned. All of the preceding patent applications are incorporated herein by reference.

FIELD OF THE INVENTION

This invention relates to a method and system for recycling solutions wherein the solution is a physical emulsion of a finishing agent and water. This invention specifically relates to the removal of contaminants from various surfaces and the recycling and reuse of the finishing agent and water used in the process.

BACKGROUND OF THE INVENTION

In various manufacturing processes, for example, in the manufacturing of plastic, fiberglass, wood, metal and ceramic products, the application of oils is often required to cool and/or lubricate surfaces during the forming of such products or prior to subsequent use of such products. It is often necessary to remove such oils prior to the application of a protective or decorative coating to such products. Disposal of removed oils, as well as the caustic and acidic solutions typically used to remove such oils, presents significant environmental pollution problems. Especially in industries involved in removing oils from metal surfaces, highly acidic agents, including hydrofluoric, sulfuric, phosphoric and nitric acids, are employed. For example, U.S. Pat. No. Re 32,661 by Binns discloses a method of finishing aluminum using an acidic aqueous finishing solution having a pH less than 2. Similarly, U.S. Pat. No. 3,969,135 by King discloses a composition and process for finishing aluminum using a low temperature aqueous acidic solution with a pH of less than 2. Others involved in the manufacturing of metal products employ highly caustic reagents, posing similar environmental disposal problems as those presented by the use of acidic agents. Such caustic agents include alkali metal hydroxide, hexavalent chromium, and alkali metal metasilicate (e.g., U.S. Pat. Nos. 3,951,682 by Schevey et al., 4,477,290 by Carroll et al., and 4,270,957 by Donakowski et al.). Both acidic and caustic agents must be neutralized prior to environmental discharge, thus adding to the overall costs involved in treatment operations.

Conventional acidic and caustic finishing agents are typically used in an aqueous solution. Unfortunately, water used in such finishing processes is not easily recoverable in a sufficiently pure form to permit discharge into water streams or to reuse in finishing operations. Tremendous quantities of water are polluted in conventional finishing procedures, thus necessitating the use of costly clean-up procedures to comply with increasingly strict environmental water quality regulations. Moreover, acidic and caustic finishing agents are known to react with the oils present on the surfaces being treated, thereby preventing the recovery of both uncontaminated finishing agents used in the process and uncontaminated oils removed during treatment operations. Thus, significant expenditures of time and money are required to treat or destroy the acidic, caustic and oil residues produced in such processes.

Others have proposed various recycling schemes to reduce the problems encountered in such finishing processes. For example, articles have been submerged rather than sprayed with a finishing solution to facilitate later separation of finishing solutions for potential reuse (U.S. Pat. Nos. 3,951,682 by Schevey et al., 4,498,934 by Potts, and 2,923,648 by K'burg). Such processes, however, are time consuming and therefore limit production capacity. Other methods of recycling have required addition of chemicals, such as surfactants, demulsifiers or chelating agents, to facilitate recycling of various components (e.g., U.S. Pat. No. 4,136,217 by Henley). The separation of the various components used in a finishing operation is hampered due to the presence of added chemicals rendering the reuse of various liquid streams impractical for rinsing operations.

It would therefore be desirable to provide an environmentally safe and economical method for the recycling of finishing agents, water and oils removed from surfaces during manufacturing operations. In particular, a closed loop recycling system would be highly desirable which is able to generate sufficiently uncontaminated water for reuse in such a system, and that allows for the recovery of a reusable finishing agent and reusable oils removed in the manufacturing process.

SUMMARY OF THE INVENTION

The present invention is directed to an environmentally and economically advantageous method and system for recycling a finishing agent that is capable of removing contaminants from the surface of articles. In one embodiment, a finishing agent having a substantially neutral pH is used to remove contaminating oils applied during the manufacture of a wide variety of surfaces. The pH of the finishing agent used can range from about pH 6.0 to about pH 9.0, and preferably includes, as an active agent, a terpene such as d-limonene, α-terpineol, β-terpineol, α-pinene, β-pinene, alcohols of these compositions, or mixtures thereof. Preferably, a surface to be treated is contacted with about 2 volume % to about 40 volume % of a terpene. In a preferred embodiment, the active finishing agent is d-limonene.

In accordance with the present invention, the finishing agent is physically emulsified in the presence of water prior to application to a surface to be treated. The physical emulsion enables efficient application of the finishing agent to the surface and allows for the substantially spontaneous separation of the resulting wash solution into an aqueous phase and a non-aqueous phase. The separated water contained in the aqueous phase can be collected and directed back into the system for use in further treatment of additional articles, such as rinsing. The finishing agent combined with the contaminants from the surface of the articles can be collected in the non-aqueous phase, separated and further purified for reuse in subsequent finishing process of other surfaces. Thus, the present invention allows for an environmentally safe and economical method and system for the recycling of finishing agent, contaminants and water used to finish surfaces having contaminants thereon. The present method and system have particular application in the removal of contaminants from the surfaces of metal containers and the recycling of water, terpene and contaminants used in such procedures.

DETAILED DESCRIPTION OF THE INVENTION

Figure 1:
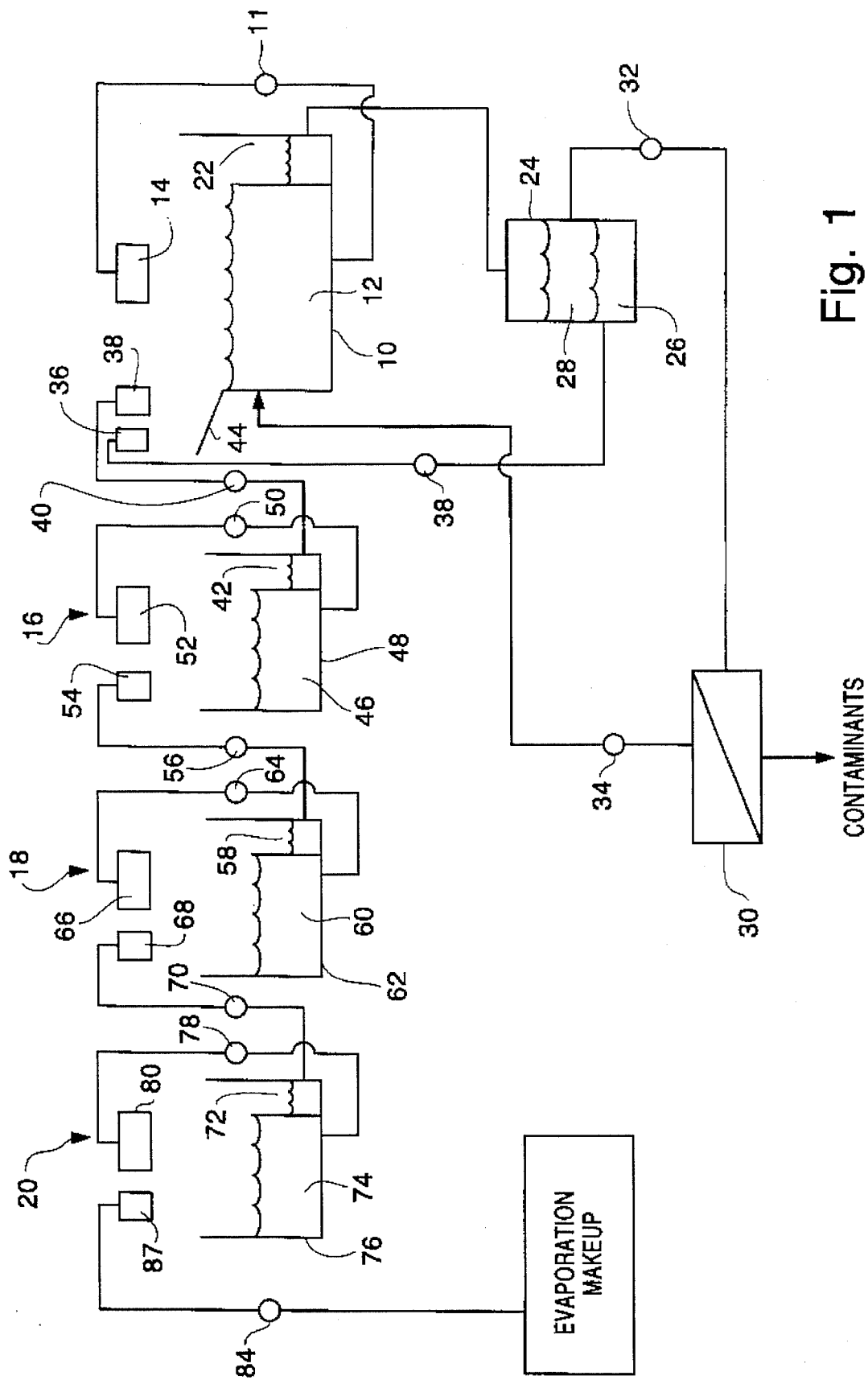
FIG. 1 is a schematic flow diagram showing the application of wash and rinse solutions and the flow of such solutions and waste solutions therefrom through the washing, rinsing, filtering, and reclaim stages of the present invention.

The method of the present invention is suitable for the finishing of any surface wherein the surface is contacted with contaminants during production of such surfaces. Surfaces that can be treated with the present invention include, but are not limited to, plastic, fiberglass, wood, ceramic and metal articles. In particular, metal articles can include, but are not limited to, aluminum, including treated aluminum, magnesium, including treated magnesium, steel, including tin-free steel, brass, copper, tin or alloys thereof. The present invention has application in the finishing of metals used to produce parts for automobiles, airplanes, railroad cars, metal components used in high technology industries, computer and calculator face plates, containers, precision metal parts, shiny metal components (e.g., doorknobs), and other manufactured metal articles. Effective finishing agents are those that do not substantially etch the surface being finished.

One notable and specific use of the method and system of the present invention is for finishing the surfaces of metal containers. The term container, as used herein, refers but is not limited to, beverage cans, food containers and other containers such as aerosol cans and oil filters. In particular, the present invention includes a process and system for removing contaminants and metal fines from metal containers and/or from metal used in making metal containers by contacting a physically emulsified, substantially neutral pH finishing agent composition to a metal container to remove undesired contaminants applied to such surfaces during the manufacturing of such containers. While the present invention has particular application in the container manufacturing industry, it should be apparent that it also has application in various other fields in which contaminants must be removed from surfaces prior to subsequent use.

The term finishing agent as used herein refers to compounds or compositions having a substantially neutral pH and that are effective in removing contaminants from surfaces. Substantially neutral pH refers to compounds or compositions that do not cause readily detectable etching of a surface and more particularly refers to a pH of between about pH 6.0 and about pH 9.0, more preferably between about pH 6.0 and about pH 8.0, and most preferably between about pH 6.5 and about pH 7.5. In a preferred embodiment, the finishing agent is hydrophobic and preferably comprises an effective amount of a terpene having the general chemical formula $C_{10}H_{16}$ and are based on the isoprene unit $C_4H_8$. The term terpene includes terpene derivatives or terpenoids as well as monocyclic, bicyclic, polycyclic or acyclic terpenes. Preferably, terpenes used in the present process and system include d-limonene, α-terpineol, β-terpineol, α-pinene, β-pinene, alcohols of such compounds, and mixtures thereof.

Contaminants refers to any water insoluble organic substance, particularly a petroleum-based or synthetic organic compound, that is deposited on an article's surface during industrial processes. As used herein, water insoluble substances refers to any substance that is not dispersible in water at the molecular or ionic level. Such water insoluble substances are therefore not effectively removed from a surface by water. Contaminants typically will be lubricants and/or coolants, such as forming oils, cutting oils, mill oils, and anti-rust oils, which are commonly composed of petroleum products, esters, diesters and/or fatty acids. Preferred contaminants in the present invention are synthetic in origin including polyglycols, fatty acids, ethers including polyphenyl ethers, and esters including diesters, triesters and tetraesters and including phosphate esters, dibasic acid esters, silicate esters, and neopentyl polyol esters. Contaminants are commonly emulsions of an oil in water, typically having oil concentrations in the range of about 5 volume percent to about 25 volume percent. Metal coil stock for making metal articles, such as containers, for example, is frequently contacted with a number of compositions to lubricate the surface of the metal and to reduce the temperature in the metal.

Preferred contaminants are contaminants having a well-defined lower molecular weight value such that a molecular weight distribution of the contaminants does not go substantially below a given molecular weight. In this manner, effective filtration of system components can be achieved, as discussed below. Thus, preferred contaminants include synthetic oils having a well-defined molecular weight range or petroleum-based oils having a well-defined molecular weight fraction. In a preferred embodiment, the contaminant is an oil with a molecular weight of at least about 300 and more preferably above about 500. In a preferred embodiment of the invention, the contaminant comprises a petroleum fraction having a minimum chain length of 20 carbon atoms, more preferably a minimum chain length of 35 carbon atoms, and more preferably a minimum chain length of 50 carbon atoms. A preferred contaminant includes a tetraester, such as a tetraester formed from the esterification of 10–30 carbon chain saturated fatty acids with pentaerythritol. For example, a preferred contaminant includes a tetraester such as in an amount of about 86 volume percent, S-MAZ80 in an amount of about 6 volume percent, BRIJ-30 in an amount of about 4 volume percent, Mazon 224-86 in an amount of about 2 volume percent, and Mazon RI6 in an amount of about 2 volume percent. S-MAZ80, BRIJ-30 and Mazon 224-86 are surfactants and emulsifying agents available from Mazer Chemical. Mazon RI6 is a rust inhibitor available from Mazer Chemical.

Contaminants having a low molecular weight or a broad molecular weight distribution including low molecular weight species can pass through the pores in certain filters, resulting in poor filtration, such as cross-flow filters. In contrast, preferred contaminants having a well-defined lower molecular weight value greater than the relevant pore size typically will not pass through the pores in a filter. As used herein, cross-flow filter refers to a device which separates components in a pressurized feed stream moving parallel to a filter membrane. In cross-flow filtration, molecules below a desired size pass through the membrane walls. Molecules above a desired size are substantially incapable of passing through the membrane walls and pass through the filter.

In accordance with the present invention, contaminants, as broadly described above, deposited on a surface are effectively removed by contacting the surface with a physical emulsion of a finishing agent and water in an amount and concentration sufficient to remove contaminants from the surface. The term "physical emulsion" of two liquids, as used herein, refers to a preparation of two liquids which are not soluble in one another, i.e., not dispersible at the molecular or ionic level, and in which one liquid is a dispersed phase and the second is a continuous phase as a result of physical agitation or mixing of the two liquids. A physical emulsion of the present invention is characterized by its ability to separate into an aqueous phase and a finishing agent-containing phase in less than about 1 minute, preferably in less than about 30 seconds and most preferably in less than about 10 seconds. A physical emulsion useful in the present invention typically does not contain effective amounts of surfactants and emulsifiers that prevent the separation of an aqueous phase from an immiscible or oil-containing phase The term "aqueous phase" as used herein, refers to a phase of liquid that is dispersable in water at the molecular or ionic level. The term "non-aqueous phase", as used herein, refers to a phase of liquid that is not dispersable in water at the molecular or ionic level (e.g., water insoluble liquids). A physical emulsion can be formed by the physical agitation of water with a finishing agent, such as by pumping, stirring, mixing or shaking of liquids with sufficient shear to form a substantially homogenous emulsion. It should be noted that because of the efficient separation of the components of the physical emulsion, the present process is particularly suited for use as a continuous process.

The physical emulsion of the present invention includes a finishing agent at a concentration effective for cleaning in a particular application. Typically, the finishing agent is present in an amount of between about 2 volume percent and about 40 volume percent, more preferably between about 3 volume percent and about 30 volume percent, and more preferably between about 5 volume percent and about 20 volume percent based on total volume of the physical emulsion. The physical emulsion also includes water present in amounts between about 60 volume percent and about 98 volume percent, more preferably between about 70 volume percent and about 97 volume percent, and more preferably between about 80 volume percent and about 95 volume percent based on total volume of the physical emulsion. It should be noted that the physical emulsion can contain significant amounts of other components provided that they do not negatively affect the ability of the finishing agent and water to separate efficiently, as described above.

The physical emulsion is preferably contacted with a surface having contaminants on it by spraying it onto the surface. The resultant mixture of the physical emulsion components and contaminants are collected in a vessel and the components of the mixture are allowed to separate. The components of the physical emulsion efficiently separate, as described above. The contaminants and finishing agent separate into the non-aqueous phase. Thus, water can be separated as an aqueous phase from a phase comprising removed contaminants and finishing agent. Such water is relatively clean, typically having less than about 500 ppm organic, more preferably less than about 350 ppm and more preferably less than about 200 ppm organic. Such water is preferably recycled to be reused in rinsing of the finished surface.

The separated mixture of finishing agent and contaminants can be further treated to separate the finishing agent and contaminants. Such separation can be accomplished by any suitable means, including filtration, such as by a cross-flow filter. Such filters can be made of any suitable materials, including ceramic and polymer membranes, such as polypropylene, surface treated polypropylene, and surface treated polyacrylnitrile and preferably is made of ceramic. Appropriate filter pore sizes can be determined dependent on the specifics of a particular system.

It should be noted that a primary advantage of the present process is the use of a physical emulsion that, in a contaminated wash solution, an aqueous phase that includes water and an non-aqueous phase that includes finishing agent and contaminants. The finishing agent can be further separated from the contaminants in the non-aqueous phase by filtration as described above. Due to a more significant molecular weight difference between typical contaminants and finishing agents than between water and typical finishing agents, filtration of a contaminant/finishing agent-containing phase is more readily accomplished than separation of a water/finishing agent-containing phase which is the product of common chemically emulsified systems which release contaminants upon settling leaving a chemically emulsified water/finishing agent-containing phase.

The present invention, as generally described above and more specifically described below, has several advantages over conventional finishing processes. The advantage of the present invention is that the use of a hydrophobic, substantially neutral pH finishing agent allows for easy recycling of the finishing agent, contaminants, and water, and thus for a substantially continuous and/or closed loop recycling system. The present recycling process and system relies primarily upon the ability of the finishing agent to become physically emulsified in water long enough to permit the resulting physical emulsion to be contacted with a contaminated surface. Upon contacting such a surface, the finishing agent effectively reacts with the contaminants and allows for the removal of such contaminants from the surface. The physical emulsion of the finishing agent and water in the absence of other compounds, (.e.g., surfactants) facilitates the efficient separation of water, contaminants and finishing agent.

In one embodiment of the present invention, metal containers are finished as part of a continuous process for stamping, forming, ironing, doming, finishing and decorating metal containers. Such a continuous process can include, for example, stamping a circular piece of aluminum from a roll of sheet aluminum and forming the circular piece into a cup-like configuration. The process further includes elongating the container size by use of one or more ironing dies to form the container to a desired height and final configuration. The bottom of the container can be domed to produce a concave bottom surface of the final container. The containers are then finished, for example, by the present process, to remove contaminants applied to the container during the forming process.

Typically, the thickness of the metal comprising the sides of a container used to hold a beverage, such as a soft drink or beer, is at least about 0.004 of an inch. The thickness of metal containers is largely determined by the need for column strength which is affected by pin-hole leaks in containers. Pin-hole leaks develop from the use of conventional acidic and caustic finishing agents which enlarge and deepen pits and grooves present in ironed and drawn metal. Containers must be of a sufficient thickness to allow for the formation of pits and grooves without affecting the integrity of such containers. Use of the present invention reduces the pin-hole leak problem since the use of a finishing agent in accord with this invention to remove oils from metal containers does not deepen existing pits and etches in the metal. As a consequence, by using the present invention, the thickness of metal used in container manufacturing processes can potentially be reduced which would result in substantial savings.

The present invention includes the finishing of metal containers in the above-described container production process in a washer by spraying the physical emulsion of the present invention on the metal containers as they are conveyed past sprayheads. For example, containers can be conveyed on a large mesh conveyor in an open-end down manner, with finishing agent sprays directed from the top and bottom so that the sprays contact all surfaces of the container. Subsequently, the containers are rinsed with water. The containers are then dried, typically with an oven dryer.

A significant benefit achieved by the present invention relates to the recyclability of the finishing agent, water and removed oil attendant to the process. In conventional metal finishing processes, acidic and caustic washes are difficult to handle and to dispose of.. In contrast, the finishing agent used in the method and system of the present invention is non-hazardous and is easily separated and recycled.

In one embodiment of the present invention, a recycling system is provided for finishing articles. This system comprises a means for contacting the surfaces of articles with a physically emulsified mixture of finishing agent and water, a means for rinsing the physical emulsion and contaminants from the surfaces with rinse water, a means for separating the finishing agent, the water, and the contaminants, and a means for recycling one or more of the three separated components. By using this recycling system, the finishing agent and water, after being separated, can be reused in the finishing of further articles in a continuous and/or substantially closed loop system.

One particular embodiment of the invention is directed to the finishing of metal containers. Referring now to FIG. 1, in a preferred embodiment, metal containers (not shown) having contaminants on their surfaces are conveyed above a washer reservoir 10 and are sprayed with a physically emulsified finishing solution containing terpene and water. The physical emulsion can be formed by the mechanical action of a pump 11 for recirculating wash solution 12 to washer sprayhead 14 or by other mechanical mixing means (not shown).

After being conveyed above the washer reservoir 10, the metal containers are further conveyed through successive first, second and third rinse stages 16, 18, 20 where they are repeatedly sprayed with water to remove remaining traces of finishing agent and contaminants present on the metal containers. Metal containers are rinsed successively by each of the three stages. Rinse water is cycled through the three rinse stages 16, 18, 20 for reuse in prior rinse stages.

The contaminants removed from the containers during washing are collected in the washer reservoir 10, along with terpene and water derived from the physical emulsion finishing solution. The resulting wash solution containing the contaminants, terpene and water is allowed to spill over into a wash weir 22. Typically, the concentration of contaminants and terpene in the wash weir spillover will be relatively high because some separation will occur in the wash reservoir 10. The solution from the wash weir 22 is continuously directed to a separating tank 24, where the water phase 26 separates from the contaminant- and terpene-containing phase 28. In the separating tank 24, the wash solution is allowed to separate until the contaminant- and terpene-containing phase 28 floats on top of the water phase 26. The contaminant- and terpene-containing phase 28 is then directed to a separator filter 30 which separates the contaminants from the terpene by a pump 32.

In a preferred embodiment, the filter 30 comprises a ceramic filter capable of letting terpene pass through its walls, while directing the contaminants in the solution through its length. The contaminants from the filter 30 can then be either recovered and recycled or disposed of. The terpene is directed back to the washer reservoir 10 by a pump 34.

The water from the separating tank 24 can be directed to a sprayhead 36 just after the wash stage by a pump 38 for use in rinsing metal containers.

After containers are conveyed by washer sprayhead 14, they are passed under a first pre-rinse sprayhead 38 which sprays rinse water from the first rinse stage 16 by a pump 40. Rinse water sprayed through the first pre-rinse sprayhead 38 is conducted from the first rinse stage weir 42. Rinse water sprayed through the first pre-rinse sprayhead 38 is sprayed over a collection tray 44 to collect drained rinse water for return to washer reservoir 10.

After passage under the first pre-rinse sprayhead 38, containers are passed under the rinse sprayhead 36 with the water phase 26 from the separator 24. Water is also drained from sprayhead 36 onto collection tray 44.

Containers are then conveyed to first rinse stage 16. Rinse water 46 is circulated from first rinse tank 48 by pump 50 to first sprayhead 52. The rinse water 46 overflowing into weir 42 has a relatively high concentration of terpene and/or contaminant because as any separation from water occurs in rinse water 46, the terpene and contaminant would separate to the top and overflow.

After passage under the first rinse sprayhead 52, containers are conveyed to the second rinse stage 18. Rinse water 60 is circulated from second rinse tank 62 by pump 64 to second rinse sprayhead 66. The rinse water 60 overflowing into weir 58 has a relatively high concentration of terpene and/or contaminant compared to the remaining rinse water 60. The water from the overflow weir 58 is conducted back and collected in the first rinse tank 48.

After passage under the second rinse sprayhead 66, containers are conveyed to the third rinse stage 20. Rinse water 74 is circulated from the third rinse tank 76 by pump 78 to third rinse sprayhead 80. The rinse water 74 overflowing into weir 72 has a relatively high concentration of terpene and/or contaminant compared to the remaining rinse water 74. The water from the overflow weir 72 is conducted back and collected in the second rinse tank 62. A water source is provided to make up for any loss of water from the system due to evaporation, spillage and water carried out of the system on containers.

In conjunction with the present invention, a hood, exhaust stack and stack condenser can be placed over the washing and rinsing stages described above to control the amount of volatile organic compounds released during these stages. In a preferred embodiment, terpene emissions can be captured by a hood and condensed by a stack condenser placed within an exhaust stack at a flow rate of about 250 ft$^3$/minute.

While various embodiments of the present invention have been described in detail, it is apparent that modifications and adaptations of those embodiments will occur to those skilled in the art. However, it is to be expressly understood that such modifications and adaptations are within the scope of the present invention, as set forth in following claims.

What is claimed is:

1. A process for finishing articles, comprising:
   a) contacting an article comprising a material selected from the group consisting of metal, ceramic, fiberglass, plastic and wood, said article having contaminants thereon with a physical emulsion of a terpene finishing agent and water, said physical emulsion having no effective amount of surfactants or emulsifiers capable of preventing the separation of an aqueous phase from an immiscible or oil-containing phase, to remove said contaminants from said articles and from a mixture of said physical emulsion and contaminants;

b) then allowing said water in said mixture to separate from said finishing agent and said contaminants; and c) using said water which has separated from said finishing agent and contaminants to rinse said article.

2. The process as set forth in claim 1, comprising further separating said finishing agent from said contaminants.

3. The process as claimed in claim 2, wherein said further separating comprises filtering said finishing agent from said contaminants with a cross-flow filter.

4. The process as set forth in claim 1, wherein said articles comprise metal containers.

5. The process as set forth in claim 1, wherein said finishing agent is present in said physical emulsion at a concentration of between about 2% and about 40% by volume based on total volume of said physical emulsion.

6. The process as set forth in claim 1, wherein said finishing agent is selected from the group consisting of d-limonene, $\alpha$-terpineol, $\beta$-terpineol, $\alpha$-pinene, $\beta$-pinene, alcohols thereof and mixtures thereof.

7. The process as claimed in claim 6, wherein said finishing agent is d-limonene.

8. The process as claimed in claim 1, wherein the molecular weight of said contaminants is greater than 300.

9. The process as claimed in claim 1, wherein said water separates from said finishing agent and contaminants in less than one minute.

10. The process as set forth in claim 1, further comprising filtering said finishing agent through a ceramic filter.

11. A process for finishing articles, comprising:

a) contacting an article comprising a material selected from the group consisting of metal, ceramic, fiberglass, plastic and wood, said article having contaminants thereon with a physical emulsion of terpene finishing agent and water, said physical emulsion having no effective amount of surfactants or emulsifiers capable of preventing the separation of an aqueous phase, to remove said contaminants from said articles and from a mixture of said physical emulsion and contaminants;

b) then allowing said water in said mixture to separate from said finishing agent and said contaminants; and c) then reusing said finishing agent to finish another article.

12. The process as set forth in claim 11, comprising further separating said finishing agent from said contaminants.

13. The process as claimed in claim 12, wherein said further separating comprises filtering said finishing agent from said contaminants with a cross-flow filter.

14. The process as set forth in claim 11, wherein said articles comprise metal containers.

15. The process as set forth in claim 11, wherein said finishing agent is present in said physical emulsion at a concentration of between about 2% and about 40% by volume based on total volume of said physical emulsion.

16. The process as set forth in claim 11, wherein said finishing agent is selected from the group consisting of d-limonene, $\alpha$-terpineol, $\beta$-terpineol, $\alpha$-pinene, $\beta$-pinene, alcohols thereof and mixtures thereof.

17. The process as claimed in claim 16, wherein said finishing agent is d-limonene.

18. The process as claimed in claim 11, wherein the molecular weight of said contaminants is greater than 300.

19. The process as claimed in claim 11, wherein said water separates from said finishing agent and contaminants in less than one minute.

20. The process as set forth in claim 11, further comprising filtering said finishing agent through a ceramic filter.

\* \* \* \* \*